United States Patent
Okuyama

(10) Patent No.: US 6,289,169 B1
(45) Date of Patent: Sep. 11, 2001

(54) APPARATUS AND METHOD OF DISPLAYING RECORDING

(75) Inventor: Takehiko Okuyama, Kanagawa-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/386,414

(22) Filed: Aug. 31, 1999

Related U.S. Application Data

(63) Continuation of application No. PCT/JP99/02229, filed on Apr. 27, 1999.

(30) Foreign Application Priority Data

May 7, 1998 (JP) .................................................. 10-125041

(51) Int. Cl.$^7$ .......................... H04N 5/761; H04N 5/7617
(52) U.S. Cl. ................................................ 386/83; 386/46
(58) Field of Search ............................ 386/83, 92, 46–52, 386/4; 348/735, 734, 731, 6, 7, 10, 12, 13, 5; 360/32; H04N 5/761, 5/7617

(56) References Cited

U.S. PATENT DOCUMENTS 5,541,738 * 7/1996 Mankovitz ............................. 386/83

FOREIGN PATENT DOCUMENTS

| 7-162777 | 6/1995 | (JP) . |
| 9-63443 | 3/1997 | (JP) . |
| 9-163298 | 6/1997 | (JP) . |
| 9-326993 | 12/1997 | (JP) . |
| 10-42242 | 2/1998 | (JP) . |
| 10-285522 | 10/1998 | (JP) . |

* cited by examiner

*Primary Examiner*—Robert Chevalier
(74) *Attorney, Agent, or Firm*—Pillsbury Winthrop LLP

(57) ABSTRACT

A controller makes a demultiplexer select a transport stream corresponding to user's operation, and supplies it to a VTR through an I/F circuit. The I/F circuit of the VTR gives the transport stream to a recording/reproducing unit for recording, and transmits EIT data to a TV to supply them to a program guide GUI generating part. The GUI generating part generates GUI data based on the inputted EIT data, and makes them stored in a cassette memory using a cassette memory unit of the VTR. At the time of reproduction, GUI data read by the cassette memory unit is supplied to the program guide GUI generating part, and a program guide display of programs recorded on a cassette tape is displayed. In this manner, guide information on programs recorded on a cassette tape is automatically displayed.

10 Claims, 7 Drawing Sheets

FIG.2

IDNO = 1

PROGRAM TITLE

GENRE

RECORDED DATE

ARTIST INFORMATION

. . . .

RECORDED POSITION

GUI DATA

IDNO = 2

PROGRAM TITLE

GENRE

RECORDED DATE

ARTIST INFORMATION

. . . .

RECORDED POSITION

GUI DATA

. . . .

. . . .

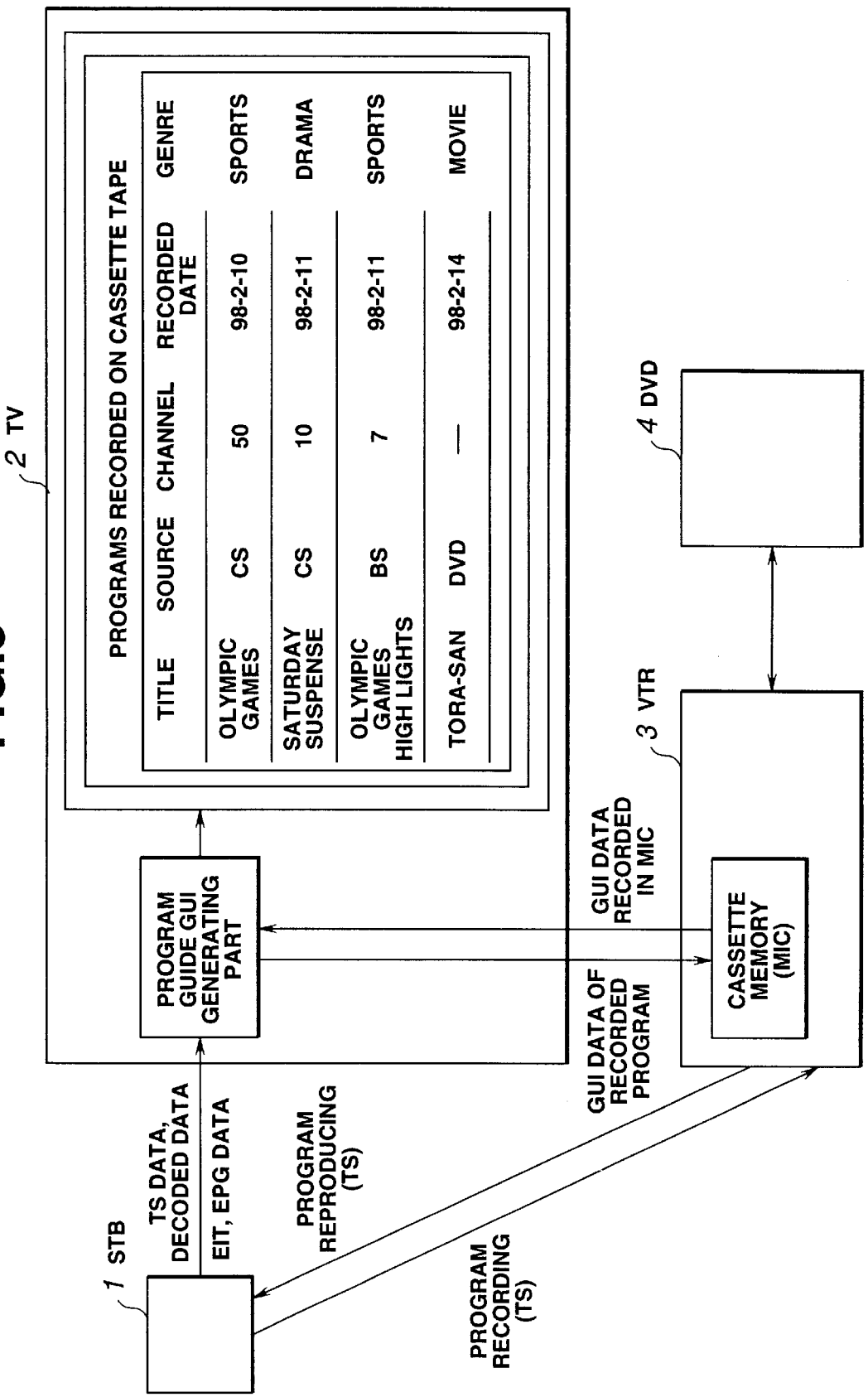

FIG.4

| CHANNEL | BS7 | BS9 | BS10 | CS35 |
|---|---|---|---|---|
| 19:00 | NEWS 001 | BROADCAST OF PROFESSIONAL BASEBALL GAME 004 | BROADCAST OF OLYMPIC GAMES 008 | MOVIE "TERMINATOR 2" 012 |
| 20:00 | | | | |
| 21:00 | BROADCAST OF THE DIET 002 | | SATURDAY SUSPENSE 009 | DRAMA "YUKIMURA SANADA" 013 |
| 22:00 | | TODAY'S COOKING 005 | MUSIC FAIR 010 | |
| 23:00 | OLYMPIC GAMES HIGHLIGHTS 003 | SPORTS NEWS 006 | ASIAN POPULAR SONG SHOW 011 | |
| 24:00 | | MOVIE "LIMELIGHT" 007 | | |

PROGRAM TO BE RECORDED ☐

FIG.5

| PROGRAM TITLE | SOURCE | CHANNEL | GENRE | ARTIST | ----- |
|---|---|---|---|---|---|
| OLYMPIC GAMES HIGHTLIGHTS | BS | 7 | SPORTS | HARADA, FUNAKI, TAE SATOYA | ----- |

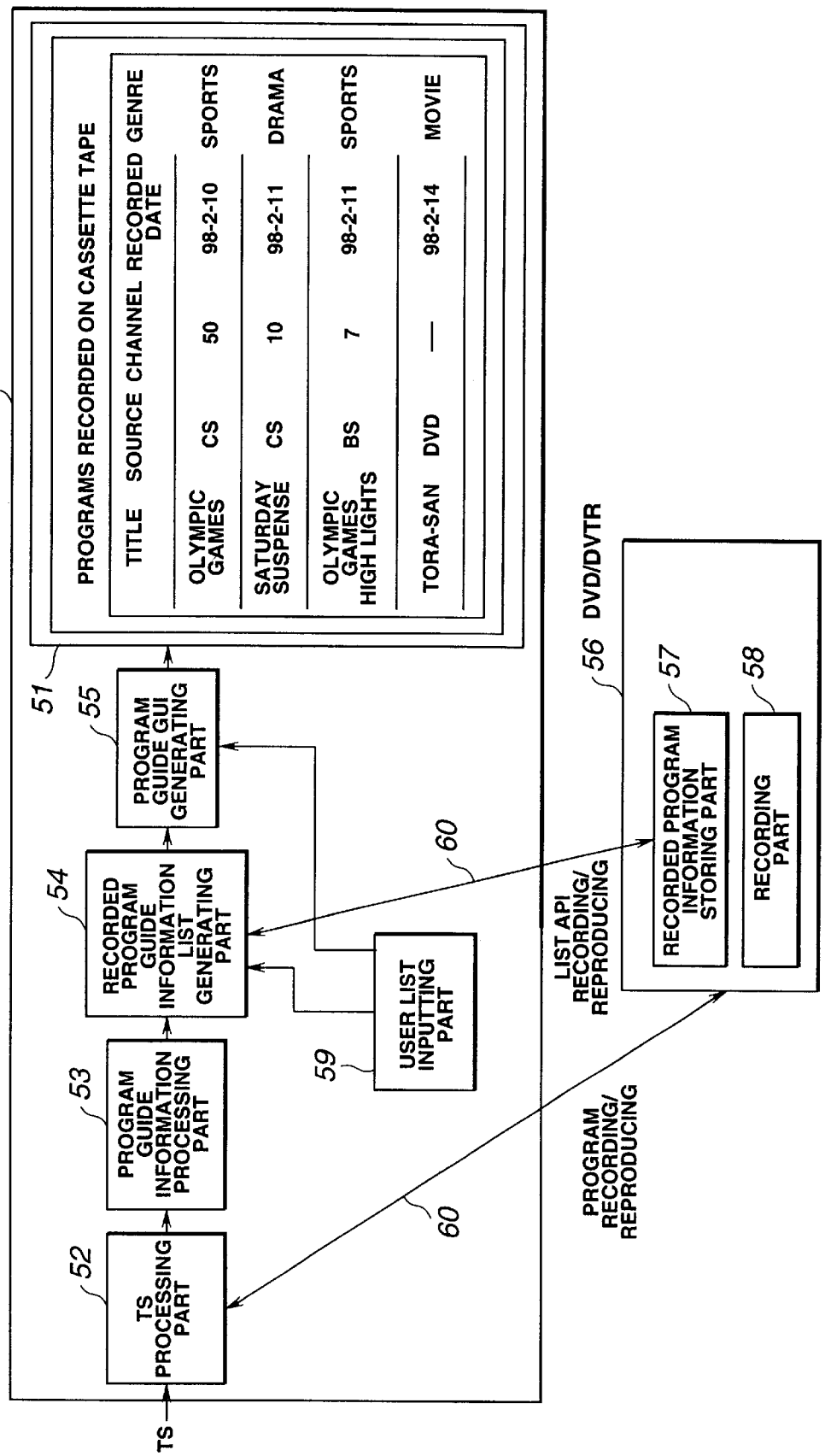

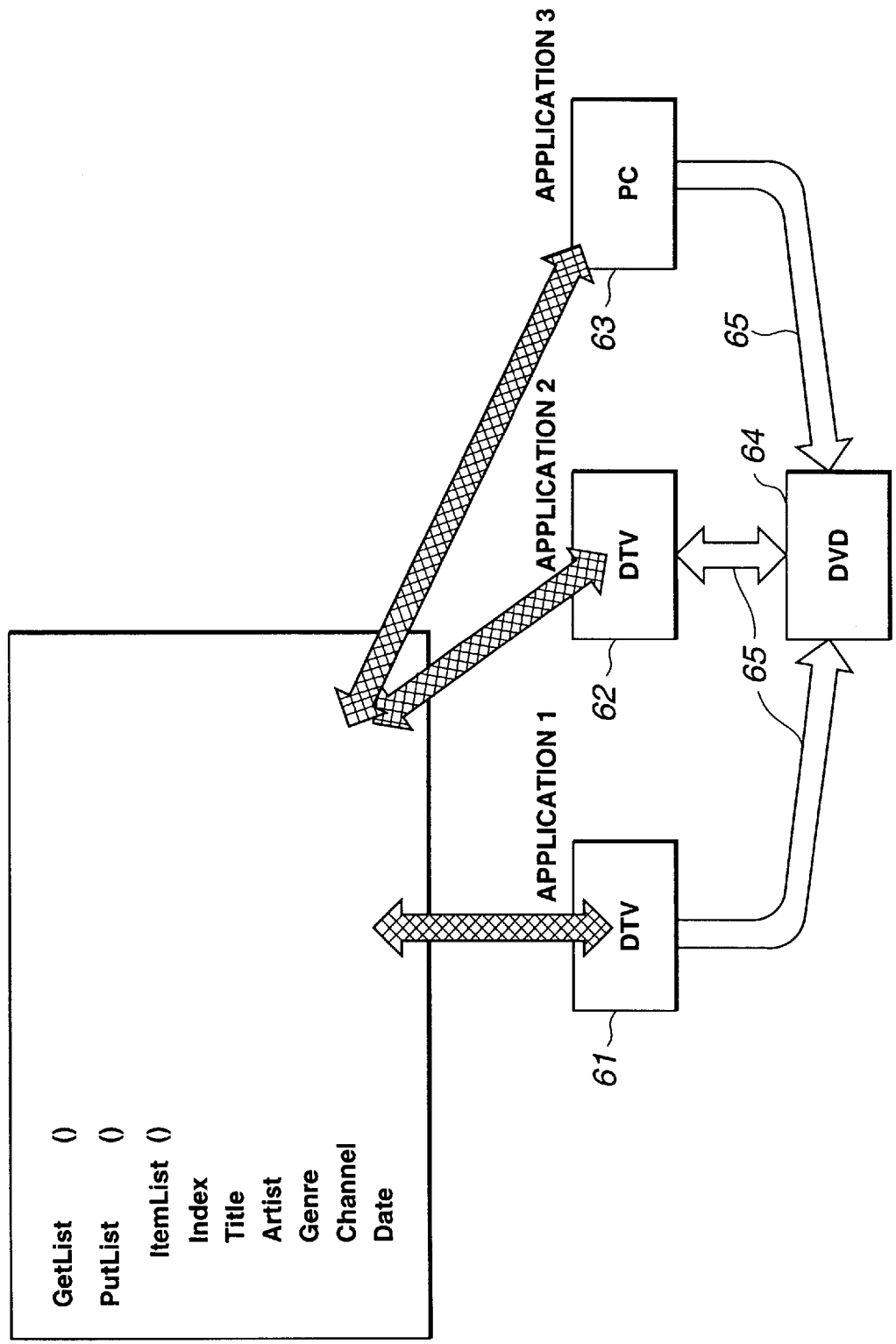

APPARATUS AND METHOD OF DISPLAYING RECORDING

This application is a continuation of PCT/JP99/02229, filed Apr. 27, 1999.

TECHNICAL FIELD

The present invention relates to an apparatus for and a method of displaying recorded contents preferred to program guide information on digital broadcast.

BACKGROUND TECHNOLOGY

Recently, satellite (BS) digital broadcast using a broadcasting satellite has been discussed. BS digital broadcast enables multichannel broadcasting by applying a compression technique using MPEG (Moving Picture Experts Group) 2. Since multichannel broadcasting significantly increases the number of programs to be broadcasted at a time, selecting a program to view becomes difficult.

To cope with this, in BS digital broadcast, an EPG (Electronic Program Guide) function is added for selecting a program electronically by displaying a program list on a screen. To realize this EPG function, in BS digital broadcast, a SIT (Selection Information Table) stream is multiplexed together with a video stream and a voice stream, and data called EIT (Event Information Table) is inserted into this SIT stream. The EIT data is program guide data of each broadcasting and introduction data of a program itself, indicating the correspondence of programs contained in each service and information related to each program.

A digital broadcast receiver which supports BS digital broadcast [hereinafter also referred to as set top box (STB)] is generally designed to prepare a program list based on received EIT data and to be provided with a program guide display generating unit for displaying the program guide data on the screen.

In such a digital broadcast receiver, received BS digital broadcast signals are demodulated after being selected by a tuner, and then, given error correction. When a broadcasting station scrambles broadcast signals to prevent non-subscribers from viewing, only programs allowed to be viewed are de-scrambled in units of packets out of streams which have undergone error correction.

As described above, digital satellite broadcast has become multichannel broadcasting and has EPG data multiplexed therein. A viewer selects a program using EPG data. Broadcast signals de-scrambled are supplied to a demultiplexer of the digital broadcast receiver. This demultiplexer fetches image and voice data and EPG data for one channel from the descrambled digital broadcast signals.

According to the MPEG2 standard, data can be transmitted in transport stream (TS) which has considered transmission of a plurality of programs in one stream. A transport stream is composed of fixed-length packets (transport packet), and contains video data, voice data and other data.

The output of a demultiplexer is a transport stream like this. A transport stream selected by a viewer is supplied to each decoder and a stream of one program (PS) is extracted. This stream is converted into data corresponding to a display and supplied to a television receiver, making a program viewable.

It is possible to make a digital recording unit, such as a DVCR (digital video tape recorder), record only one predetermined program contained in a received stream. To do this, for an interface between a digital broadcast receiver and a digital recording unit, for example, an IEEE 1394 can be used.

The IEEE 1394 standard is a low-cost peripheral interface suitable for multimedia use. The IEEE 1394 is capable of multiplex transfer of a plurality of channels and also has an isochronous transferring function which assures the transfer of video and voice data within a given time (125 $\mu$sec.).

A transport stream from a demultiplexer containing a program designated by a viewer is converted into an isochronous packet of IEEE 1394 and transmitted to a digital recording unit. At the digital recording unit, this isochronous packet is converted back into the original transport stream in the MPEG2 standard and recorded.

To view a recorded program, a transport stream reproduced from a digital recording unit is converted into an isochronous packet of IEEE 1394 and transmitted to a digital broadcast receiver. The digital broadcast receiver converts it back into the original transport stream and supplies this transport stream to a decoder. Reproduced images are viewed in this manner.

EPG is also used for recording digital broadcast signals. That is, program guide information is prepared corresponding to EPG contained in a received signal, a screen display is given based on this program guide information, and the user designates a program desired to record out of the programs displayed on the screen. An STB detects the program ID corresponding to the user's designation, converts the only transport stream containing a program with the corresponding program ID into an isochronous packet and supplies it to a digital VTR.

As an AV/C command for controlling units is specified in IEEE 1394, a method has been considered for enabling automatic video recording using a digital VTR by transmitting a video recording command in this AV/C command to the digital VTR.

A proposal for video recording using such a program guide list is disclosed in the Published Unexamined Patent Application No. 9-284664 (No. 284664/1997).

However, a problem was that no consideration was made about a device for displaying data related to programs, which have been recorded on a recording medium by a recording unit such as a digital VTR, on a screen using a GUI (Graphical User Interface).

An apparatus has been devised so that it reads data from MIC and gives a GUI display at the time when a cassette is inserted, by mounting a cassette memory called MIC in a digital VTR cassette and storing in this cassette memory video recording information on a cassette tape. Standards on such MIC are specified in "Specification of consumer-use Digital VCRs" (Bluebook). Nevertheless, even in this case, the operation for recording contents of a cassette tape in the MIC is very complicated.

This problem arises because, though it is possible to record on a magnetic tape a transport stream containing a program designated by a user out of digital broadcast signals, it is impossible to give a GUI display of data related to recorded programs without complicated operation.

Accordingly, an object of the present invention is to provide an apparatus and method of displaying recorded contents that enable an automatic display of recorded contents of a recording medium, which records transport streams obtained from digital broadcast signals, without requiring any complicated operation.

DISCLOSURE OF THE INVENTION

An apparatus for displaying recorded contents according to claim 1 of the present invention comprises a recording device which has program data inputted and records said program data on a predetermined recording medium, a storing device which has program guide information related to said program data inputted and stores information based on said program guide information on said predetermined recording medium, on which said recording device records, or on a storing medium related to said predetermined recording medium, and an output device which reads information stored in said storing device and outputs it.

In claim 1 of the present invention, program data is given to a recording device and recorded on a predetermined recording medium. In addition, information based on program guide information related to the program data is stored in a predetermined recording medium or in a storing medium related to a predetermined recording medium by a storing device. An output device reads and outputs information stored in the storing device.

A method of displaying recorded contents according to claim 24 of the present invention comprises a recording process which records said program data on a predetermined recording medium, a storing process which stores information based on said program guide information on said predetermined recording medium or a storing medium related to said predetermined recording medium, and a program guide displaying process which reads information stored through said storing process, and displays a guide display on programs recorded on said predetermined recording medium corresponding to the read information.

In claim 24 of the present invention, program data is recorded on a predetermined recording medium in recording process. Information based on program guide information related to the program data is stored through a storing process on said predetermined recording medium or in a storing medium related to said predetermined recording medium. The information stored by a storing means is read and a guide display about programs recorded on the predetermined recording medium being based on this information is displayed.

BRIEF DESCRIPTION OF THE DRAWINGS

FIG. 2 is an explanatory drawing illustrating an embodiment.

FIG. 3 is an explanatory drawing illustrating an embodiment.

FIG. 4 is an explanatory drawing illustrating an embodiment.

FIG. 5 is an explanatory drawing illustrating an embodiment.

FIG. 7 is an explanatory drawing illustrating another embodiment of the present invention.

FIG. 8 is an explanatory drawing illustrating the embodiment shown in FIG. 7.

BEST MODE OF CARRYING OUT THE INVENTION

Figure 1:
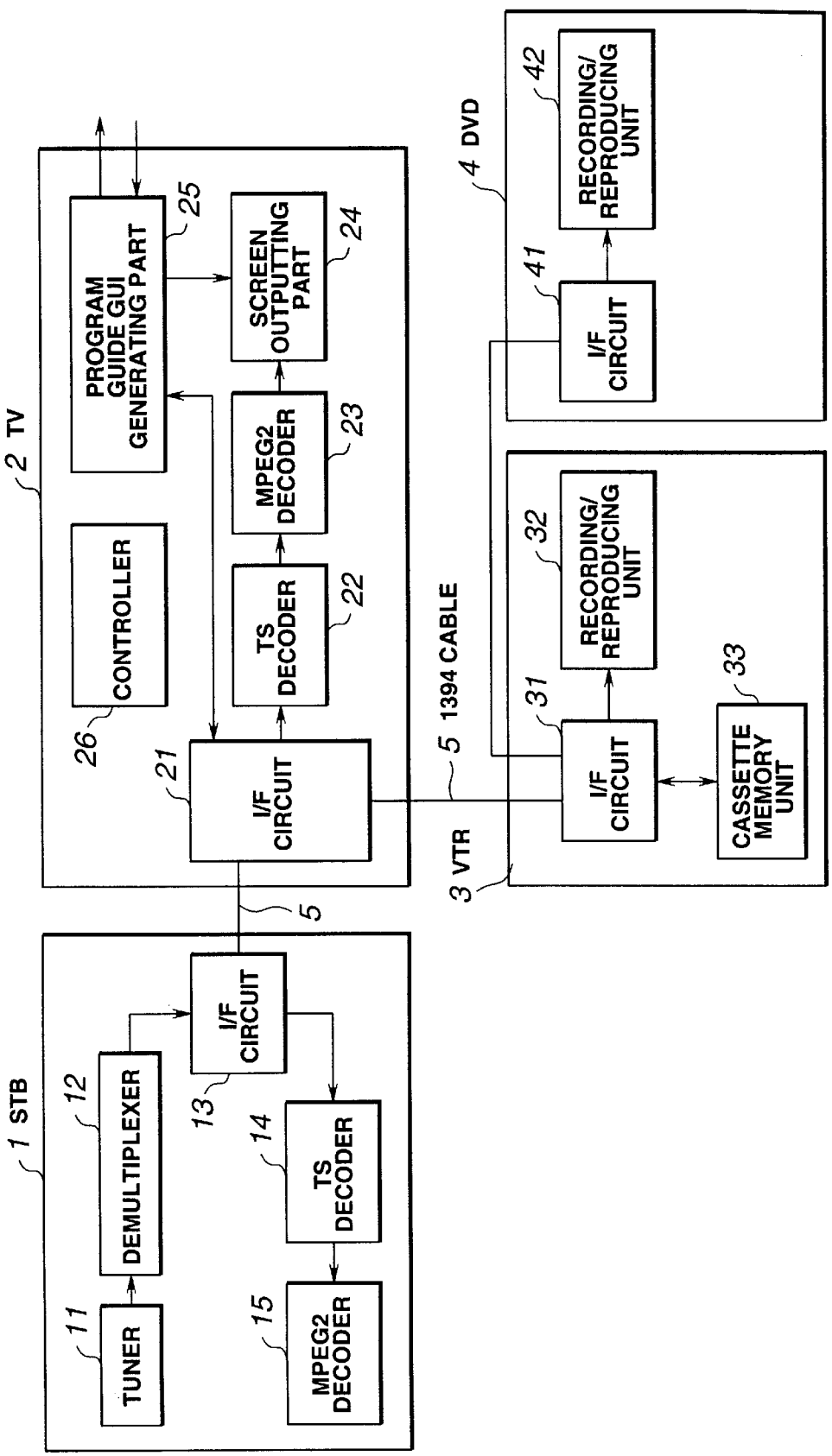
FIG. 1 is a block diagram showing an embodiment of an apparatus for displaying recorded contents according to the present invention.

Embodiments of the present invention will now be described in detail hereinafter with reference to the accompanying drawings. FIG. 1 is a block diagram showing an embodiment of an apparatus for displaying recorded contents according to the present invention. This embodiment is an example where an STB, a television receiver (TV), a VTR and a DVD are connected through an IEEE 1394 digital interface.

A BS digital broadcast signal induced at an antenna, which is not shown, is supplied to a tuner 11 of an STB 1. The tuner 11 selects a signal of a predetermined channel out of inputted high frequency signals and supplies it to a demultiplexer 12. The demultiplexer 12 is designed to give a demodulating process and an error correcting process according to the modulating/demodulating system of BS digital broadcasting, then, to fetch, corresponding to selecting operation by a viewer, images of a predetermined program, a transport stream of voice data and an SIT transport stream before outputting them to an I/F circuit 13.

When broadcast signals have been given a scrambling process, the signals are first given an error correcting process by a descrambling circuit, which is not shown, then, given a descrambling process in units of packets.

The I/F circuit 13 is an IEEE 1394 standard interface. The I/F circuit 13 is designed to output an inputted transport stream of MPEG2 standard to a TS decoder 14, and also to be able to convert the transport stream into an isochronous packet of IEEE 1394 before outputting it to an IEEE 1394 cable 5.

An I/F circuit 21 of a TV 2 interfaces data flowing on the 1394 cable 5 and a transport stream of MPEG2. The I/F circuit 21 converts a 1394 packet inputted through the 1394 cable 5 back into a transport stream and supplies it to a TS decoder 22.

Both the TS decoder 14 of the STB 1 and the TS decoder 22 of the TV 2 have similar configuration, and are designed to decode an inputted transport stream and to output program streams (PS) to MPEG2 decoders 15 and 23 respectively. The MPEG2 decoders 15 and 23 have an audio decoder and a video decoder, and convert, out of inputted program streams, audio data compressed according to the MPEG2 audio standard back into digital voice signals and video data compressed according to the MPEG2 video standard back into digital image signals before outputting them.

Output of the MPEG2 decoder 23 is supplied to a screen outputting part 24. The screen outputting part 24 is designed to have images displayed on a display screen, which is not shown, corresponding to inputted image signals. Meanwhile, also from the MPEG2 decoder 15 of the STB 1, audio and video signals corresponding to a received program are outputted. Consequently, it becomes possible to view a program according to BS digital broadcasting using a displaying unit having none of TS decoders nor MPEG2 decoders by enabling the output of the MPEG2 decoder 15 to be outputted outside.

Output of the TS decoders 14 and 22 contains not only data on ordinary programs but also an SIT stream. The TS decoder 22 outputs the SIT stream to a program GUI generating part 25 (not shown). The program GUI generating part 25 is designed to prepare image display data (hereinafter referred to as GUI data) for displaying a program information display based on EIT and EPG data contained in an SIT stream (hereinafter referred to as GUI display), and also to prepare GUI data for changing a GUI display corresponding to user's operation before outputting them to the screen outputting part 24. For example, the program guide GUI generating part 25 can prepare GUI data to display a GUI display which is a display based on SIT being added to displays for specifying a program desired to be viewed.

In this embodiment, EIT data contained in an SIT stream are supplied not only from the TS decoder 22 of the TV 2 but also from each piece of equipment connected with the cable 5, and the program guide GUI generating part 25 is designed to be able to generate GUI data for displaying a GUI display based on EIT data supplied from each piece of equipment.

A controller 26 is designed to be able to control each part of the TV 2 and each piece of equipment connected on a network corresponding to user's operation. For example, a user can designate a desired program to view by using a remote controller which is not shown. A signal corresponding to the operation of a remote controller is supplied to the controller 26, and the controller 26 controls the program guide GUI generating part 25 corresponding to the user's operation to make it display showing a result operated by the remote controller.

Moreover, the controller 26 is designed to control selection of programs by the demultiplexer 12 of the STB 1 responding to user's operation. That is, the controller 26 supplies a signal corresponding to operation of a remote controller or others by a user from the I/F circuit 21 to the demultiplexer 12 through the cable 5 and the I/F circuit 13 (not shown). In this manner, a user can designate a program to be displayed watching a program information display displayed on the screen.

The I/F circuit 21 of the TV 2 is also connected with an I/F circuit 31 of a VTR 3 through the cable 5, and further, the I/F circuit 31 of the VTR 3 is also connected with an I/F circuit 41 of a DVD 4 through the cable 5.

The I/F circuit 31 of the VTR 3 interfaces data flowing on the 1394 cable 5 and a transport stream of the MPEG2. A recording/reproducing unit 32 is designed to convert a transport stream inputted through the 1394 I/F circuit 31 into a format for recording, to record it on a predetermined recording medium, and also to reproduce data recorded on the recording medium and to output the reproduced data to the I/F circuit 31.

The recording/reproducing unit 32 can be controlled by the controller 26. The controller 26 is designed to supply an AV/C command to the I/F circuit 31 through the I/F circuit 21 and the cable 5. That is, a user designates a program to be recorded watching the program information display. A control signal corresponding to this designation is supplied to the VTR 3 by the controller 26, and a program received by the STB 1 is recorded in the recording/reproducing unit 32 of the VTR 3.

In this embodiment, the VTR 3 has the cassette memory unit 33. The cassette memory unit 33 is designed to read information written in a cassette memory, which is not shown, mounted in a tape cassette, which is not shown, and also to be able to write information from the recording/reproducing unit 32 in a cassette memory.

Besides, in this embodiment, the cassette memory unit 33 is capable of sending and receiving data to and from the I/F circuit 31, and is designed to be able to send and receive data to and from the program guide GUI generating part 25 of the TV 2 through the I/F circuits 21, 31 and the 1394 cable 5 and to write GUI data in a cassette memory. The cassette memory unit 33 may also be designed so as to write EIT data instead of GUI data on a cassette memory.

The cassette memory unit 33 is designed to record EIT data (GUI data), and at the same time, to record sequentially IDs of programs to be recorded together with information of recorded positions on a cassette tape.

FIG. 2 is an explanatory drawing illustrating records on a cassette memory.

As shown in FIG. 2, items to be written on a cassette memory are ID numbers, program titles, genre, recorded dates, information on artists, recorded positions, GUI data and so on.

The I/F circuit 41 of the DVD 4 interfaces data flowing on the 1394 cable 5 and a transport stream of the MPEG2. Though the present standard for digital VTRs for consumer-use has standardized conversion formats to and from a transport stream and a recording format, it has not standardized conversion formats for converting a transport stream of the MPEG2 into a recording format for DVD.

To cope with this, a recording/reproducing unit 42 of the DVD 4 is designed to record an inputted transport stream after converting it into a program stream (PS).

Now, a description will be given about operation of the embodiment configured in this manner with reference to the explanatory drawings in FIGS. 3 to 5.

High frequency signals induced at an antenna, which is not shown, are supplied to the tuner 11. A desired channel is selected by the tuner 11, demodulated and given error correcting process by the demultiplexer 12. The demultiplexer 12 further extracts a transport stream and an SIT stream designated by a user before outputting them to the I/F circuit 13.

The I/F circuit 13 converts the inputted transport stream into an isochronous packet and transmits it to the 1394 cable 5. As shown in FIG. 3, from the STB 1, not only decoding data and transport stream data (TS data) but also EIT and EPG data in an SIT stream are outputted.

The I/F circuit 21 of the TV 2 receives and de-packets the isochronous packet flowing on the 1394 cable 5, restores it to the original transport stream and outputs it to the TS decoder 22. The TS decoder 22 decodes the transport stream and outputs it to the MPEG2 decoder 23. The TS decoder 22 supplies EIT and EPG data in an SIT stream to the program guide GUI generating part 25.

EPG data is transmitted to the program guide GUI generating part 25, for example, several times a day. The program guide GUI generating part 25 generates display data for displaying a GUI display as shown in FIG. 4 according to inputted EPG data, and supplies them to the screen outputting part 24. The screen outputting part 24 displays, on a display screen, the GUI display (program guide display) as shown in FIG. 4. In FIG. 4, channels are indicated horizontally and time is indicated vertically showing broadcasting programs of each channel in each time zone.

The program guide GUI generating part 25 also generates GUI data for displaying a GUI display as shown in FIG. 5 based on EIT data on programs on the air. In this manner, the screen outputting part 24 displays a display as shown in FIG. 5. In FIG. 5, information is shown on a program on the air, on its program title, source, channel, genre and artists.

Now, suppose that a user records "the Olympic games highlights" broadcast from 22 o'clock on channel BS 7 using a VTR 3. The user selects "the Olympic games highlights" by operating a remote controlling unit referring to the display in FIG. 4. In this embodiment, any user interface may be adopted for this operation. For example, adaptable methods are: one, wherein a cursor is displayed in a GUI display and a program is designated by moving this cursor; or another, wherein each program is displayed with a number given and a program is designated by inputting the number from a remote controlling unit or others.

For instance, in a case where a program is designated by its number, a user inputs the number "0003" which indicates "the Olympic games highlights". The user further operates to designate recording of this program. A signal corresponding to this inputting operation is supplied to the controller 26 of the TV 2. The controller 26 outputs to the program guide GUI generating part 25 a signal for giving a display showing that "the Olympic games highlights" has been selected and recording of it has been designated. With this operation, a display of the selected program is, for example, shown as an inverse display on the display screen.

At 22 o'clock, the controller 26 outputs a signal for making the STB 1 select a transport stream containing "the Olympic games highlights" through the I/F circuit 21, and also transmits a command for recording the transport stream from the STB 1 to the VTR 3.

The demultiplexer 12 of the STB 1 extracts the transport stream containing "the Olympic games highlights" and outputs it to the I/F circuit 13 together with an SIT stream. The I/F circuit 13 converts the inputted stream into an isochronous packet and transmits it to the cable 5.

The address of output of the I/F circuit 13 is the I/F circuit 31 of the VTR 3. The I/F circuit 31 takes in the isochronous packet transmitted through the cable 5 and restores it to the original transport stream. The I/F circuit 31, concerning the transport stream containing "the Olympic games highlights", supplies the transport stream to the recording/reproducing unit 32, and concerning EIT data in an SIT stream, outputs them to the program guide GUI generating part 25 of the TV 2 through the cable 5 and the I/F circuit 21. The recording/reproducing unit 32 records the inputted transport stream.

The program guide GUI generating part 25 generates GUI data based on inputted EIT data. The GUI data is supplied to the cassette memory unit 33 of the VTR 3. The cassette memory unit 33 writes the GUI data in a cassette memory which is mounted in an inserted tape cassette. As described above, the cassette memory 33 may write EIT data from the I/F circuit 31 as they are in a cassette memory. The cassette memory unit 33, as shown in FIG. 2, further writes in a cassette memory program IDs, program titles, genre, recorded dates, information on artists and information on recorded positions.

A cassette memory is designed so as to retain written information even in a state where a tape cassette is ejected from a VTR.

Now, suppose that a user inserts a cassette tape, on which "the highlights of the Olympic games" has been recorded, into the VTR 3 in order to view the program.

When the cassette tape is inserted, the cassette memory unit 33 starts the reading of cassette memory. The cassette memory unit 33 outputs information recorded in the cassette memory to the program guide GUI generating part 25 of the TV 2 through the I/F circuit 31, the 1394 cable 5, the I/F circuit 21, etc. In other words, all of the GUI data about programs recorded on the cassette tape are supplied to the program guide GUI generating part 25.

The program guide GUI generating part 25 gives a GUI display based on the information which has been stored in the cassette memory. A display in the TV 2 in FIG. 3 shows a GUI display in this case. FIG. 3 shows that, on the cassette tape inserted into the VTR 3, four programs have been recorded with titles "the Olympic games", "Saturday suspense", "the Olympic games highlights" and "Tora-san" respectively. Referring to this GUI display, a user can know that "the highlights of the Olympic games", which he/she desires to view, has been recorded on the cassette tape inserted, and also its source, channel, recorded date and genre.

In a case where EIT data of each program has been recorded in a cassette memory, the program guide GUI generating part 25 generates GUI data based on EIT data read from the cassette memory and gives a similar display.

Reading from a cassette memory is carried out not only when a cassette tape is inserted but also at the time of reproduction and when a user commands a display.

The user, looking over the GUI display, selects "the Olympic games highlights" using a remote controller or others and commands it to be reproduced. A signal corresponding to the user's operation is supplied to the controller 26. The controller 26 supplies to the program guide GUI generating part 25 a signal for giving a display showing that reproduction of "the Olympic games highlights" was commanded, and also transmits to the VTR 3 through the I/F circuit 21 a command for instructing to reproduce the program "the Olympic games highlights".

That is, the controller 26 transmits to the VTR 3 the ID and others of the program instructed to be reproduced. The VTR 3 reads from the cassette memory the recorded position on the tape where the program, whose ID was transmitted, has been recorded, travels the tape to that position and starts reproducing. A transport stream reproduced at the recording/reproducing unit 32 of the VTR 3 is supplied to the I/F circuit 21 of the TV 2 through the I/F circuit 31 and the cable 5. This transport stream is decoded by the TS decoder 22 and the MPEG2 decoder 23, and supplied to the screen outputting part 24. In this manner, images of the program of "the Olympic games highlights" are shown by the screen outputting part 24.

When a displaying unit has no TS decoders nor MPEG2 decoders, it may be designed so that a reproducing signal from the VTR 3 is outputted to the STB 1 and the STB 1, after decoding it, supplies it to a displaying unit.

Thus, in this embodiment, since EIT data or GUI data based on EPG data is automatically stored on a cassette memory, detailed information on all programs recorded on a cassette tape can be shown as an automatic GUI display based on information on the cassette memory, requiring no complicated operation. A user, by using this GUI display, can know all recorded programs and also command reproduction of a desired program with simple operation.

Although the description was given on a case where the program guide GUI generating part 25 exists in the TV 2 in this embodiment, the program guide GUI generating part 25 may be placed anywhere in a network. It may be provided, for example, in the STB 1 or the VTR 3.

For instance, when a program guide GUI generating part is provided in the STB 1, it is obviously sufficient if GUI data is generated in the STB 1 and transmitted to the TV 2.

However, the VTR 3 sometimes records reproduced data from the DVD 4 in addition to received digital broadcasting. In this case, considering displaying DVD titles, flexibility must be higher when the program guide GUI generating part 25 is provided in a TV as it is in this embodiment.

Another advantage is that, since GUI data can be generated based on EPG data and EIT data, a common GUI display becomes possible regardless of the type of STB by providing a program guide GUI generating part in a TV.

Figure 6:
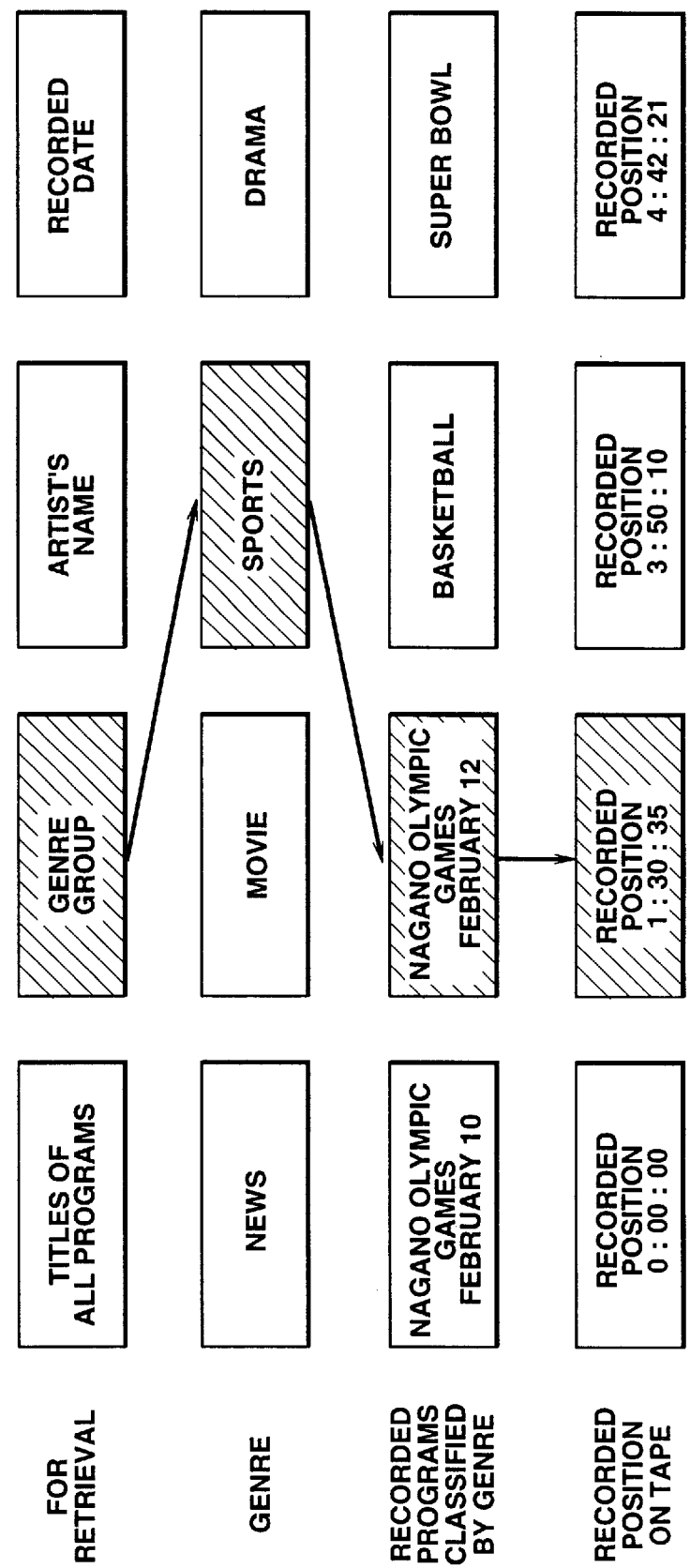
FIG. 6 is an explanatory drawing illustrating another embodiment of the present invention.

FIG. 6 is an explanatory drawing illustrating another embodiment of the present invention.

This embodiment differs from that shown in FIG. 1 only in that a program guide GUI generating part generates retrieval data. Other configuration is similar to that in the embodiment in FIG. 1, and its illustration is omitted.

In the GUI display shown in FIG. 3, information is displayed about all programs recorded on the cassette tape. When the number of programs recorded on the cassette tape is relatively large, however, the display becomes hard to see and selecting the operation becomes complicated.

To cope with this awkwardness, in this embodiment, a program guide GUI generating part is designed to generate GUI data similar to those generated by the program guide GUI generating part 25 in FIG. 1, and also to generate retrieval data on recorded programs. In other words, a program guide GUI generating part, when EIT (SIT) information is inputted from the cassette memory unit 33 of a VTR, generates retrieval data based on the inputted information. Since EIT data, as shown in FIG. 5, generally has data about genre and artists, the program guide GUI generating part generates retrieval data to retrieve corresponding to classification such as input source, key word, artists and genre. The retrieval data is supplied to the screen outputting part 24 to give a display for retrieval.

In an embodiment configured in such a manner, inserting a cassette tape into the VTR 3 gives a retrieval display, for example, as shown in FIG. 6. That is, a program guide GUI generating part gives a display for designating a retrieval type (classified retrieval) with the display in the first column from the top. In FIG. 6, displays are given for selecting a display to be displayed out of a display of titles of all programs recorded, a display for selecting genre, and displays of artists and of recorded dates.

Now, when a user operates to instruct to retrieve by genre groups, a program guide GUI generating part, corresponding to a signal from the controller 26, shows a framed display of genre groups as inverse display (shaded portion), and also gives a display showing genre of programs recorded on a cassette tape corresponding to ETI information read from a cassette memory.

In FIG. 6, the display of genre shows that programs in four genre have been recorded on a cassette tape, programs of news, movie, sports and drama. Now suppose that a user operates to instruct to retrieve a sports program. Then, a program guide GUI generating part changes a framed display of sports to an inverse display, and also gives a display for designating program in genre of sports out of programs recorded on the cassette tape based on ETI information read from a cassette memory. In FIG. 6, titles of the programs are displayed, showing that four programs in the genre of sports have been recorded on the cassette tape.

When a user commands the program of "Nagano Olympic games" on February 12, a framed display showing this program turns to an inverse display. The controller 26 transmits to the VTR 3 a program ID of the program designated by the user. With this operation, the VTR 3 reads from a cassette memory a recorded position on the tape for a program corresponding to the designated program ID, outputs it to a program guide GUI generating part, and at the same time, travels the tape to this recorded position on the tape and starts reproducing. The program guide GUI generating part displays information about the recorded position on the tape.

Thus, in this embodiment, it is an advantage that the operation for selecting a program is simple even when the number of programs is relatively large, owing to generating retrieval data generated at the program guide GUI generating part.

Though the description in each of said embodiments was given on a case where a program in digital broadcasting is recorded and reproduced, the embodiments are also applicable, as described above, in a case where data on a DVD is recorded on a recording unit such as a DVCR.

A DVD is designed so as to be able to insert a title and sub-information on a program in a TOC (table of contents) area or Title area and a sub-image signal area. By using this information in the TOC area or Title area and the sub-image signal area, a guide display of programs can be displayed similarly to a case where EIT data in digital broadcasting is used.

When data on a DVD is recorded on a DVCR, information necessary for a program guide display, information such as titles and others in the TOC area or the sub-image signal area, is transmitted from the I/F circuit 41 to a program guide GUI generating part through the cable 5. The program guide GUI generating part generates GUI data for displaying a program guide corresponding to the inputted information, and stores the generated GUI data in a cassette memory mounted in a DVCR.

At the time of reproduction, a guide display showing contents recorded on a cassette tape can be displayed by reading information stored in the cassette memory and supplying it to a program guide GUI generating part. The display in the lowest column of the GUI display shown in FIG. 3 shows that the display was given corresponding to such information from a DVD.

As described above, the cassette memory unit 33 may be designed so that program information data (SIT/EIT data) is written in a cassette memory instead of GUI data. Moreover, it may be designed so that list data prepared based on EIT data is recorded besides the method of recording EIT data as they are.

FIG. 7 is a block diagram showing an embodiment in this case. In this embodiment, a digital television receiver (hereinafter referred to as DTV) 50 having a function for processing a transport stream is adopted.

The DTV 50, which is a broadcast wave receiving/processing part, has a monitor 51. At a TS (transport) processing part 52 of the DTV 50, a transport is transmitted to a DVD-RAM or DVTR (hereinafter referred to as DVD/DVTR) 56 through a digital interface 60 such as IEEE 1394, and at a recording part 58 of the DVD/DVTR 56, the transport stream is recorded.

Meanwhile, in the DTV 50, the TS processing part 52 extracts a packet containing program data (SIT or EIT data) out of the transport stream and sends it to a program guide information processing part 53. The program guide information processing part 53 stocks, based on EIT data sent from broadcasting, information about a program, which is being sent, or program information of that channel as data base and always updates it.

Out of transport streams transmitted through the digital interface 60, the recorded program guide information list preparing part 3 prepares a list of information only about programs contained in a transport stream recorded in the DVD/DVTR 56. This list is used as API (Application Program Interface) and transmitted to a recorder such as the DVD/DVTR 56 through the digital interface 60.

A recorded program information storing part 57 of the DVD/DVTR 56 records the transmitted list API as recorded program guide information list data. There are various types of the recorded program information storing part 57 such as one which writes in a TOC area of a memory or DVD, one which records on MIC or one which makes RAM of a micro store.

This list API is an information list, which is made into an API, about programs sent by broadcasting; a list of, for example, a program's title, genre, artists and time broadcasted. That is, making the information list into an API enables a similar use by television receivers or recorders.

The table below shows an example of contents of transferred data:

| Program ID | 0      | 1      | 2      | 3      |
|------------|--------|--------|--------|--------|
| Title      | Title A| Title B| Title C| Title D|
| Artist     | a      | b      | c      | d      |
| Genre      | Sports | Tennis | Drama  | Movie  |
| Channel    | 50     | 10     | 7      | 4      |
| Date       | 980210 | 980211 | 980211 | 980214 |

As stated above, transferred data contains information such as program IDs, titles, artists, genre, channels and dates. After all information about program IDs (for example, 0, 1, 2, . . . ) is transferred, all information is sequentially transferred about titles, artists, genre, channels and dates.

FIG. 8 is an explanatory drawing illustrating contents of a list API and a form of utilization thereof.

As shown in FIG. 8, a list API contains a get list API and a put list API.

In this manner, the recorded program information storing part 57 does recording correlating with programs in transport streams actually recorded on a disk or a tape. Due to doing this, when a stream recorded on a disk or tape of a DVD or DVTR is reproduced, a recorded program guide information list is read from the recorded program information storing part 57, and data made into API is sent to the DETV 50 through the digital interface 60. Program data and data of a list API may be transmitted through different digital interfaces, or may be transmitted through a common digital interface as shown in this embodiment.

The DTV 50 acquires an API, which is made common, through the digital interface 60, sends data based on it to a program guide GUI generating part 55, and displays, on a screen of the monitor 51, program information recorded on a recording medium mounted in the recording part 58.

In addition, the DTV 50 is provided with a user list inputting part 59. The user list inputting part 59 is designed so as to be able to reload a recorded program guide information list corresponding to user's operation. That is, this design enables to add items desired by a user to the list in addition to program information which is broadcast. For example, program information transmitted by broadcasting sometimes does not contain information such as a list of artists or genre. In this case, a user adds such information to the list using the user list inputting part 59.

When this operation is carried out, the recorded program guide information list, which has been changed by a user, is transmitted as a list API to the DVD/DVTR 56. The user list inputting part 59 also enables a list API which is read from the recorded program information storing part 57 to be displayed on the screen based on the list after information was added through user's operation.

Now, another application example of API, which is made common among apparatus in this manner, will be described with reference to FIG. 8.

FIG. 8 shows an example where a list API is applicable mutually among two DTVs 61 and 62, a personal computer (hereinafter referred to as PC) 63 and a DVD 64. The configuration of the DTVs 61 and 62 is supposed to be the same as that of the DTV 50 shown in FIG. 7 and the configuration of the DVD 64 is similar to that of the DVD/DVTR 56 in FIG. 7.

The DTV 61 receives broadcasting and prepares a recorded program guide information list using the received program information. This list is given to the DVD 64 by the DTV 61 through a digital interface 65 and recorded by a recorded program information storing part of the DVD 64. Images reproduced at the DVD 64 are transmitted to a recorded program guide information list generating part of the DTV 62 through a digital interface 64. The list is added and reloaded at a user list inputting part of the DTV 62, and the reloaded list is displayed on a screen by a program guide GUI generating part. At this time, the DTV 62 transmits the reloaded list to a recorded program information storing part of the DVD 64 again and reloads the data stored at the recorded program information storing part to renew the list.

In another case where a same disk is reproduced at the DVD 64, a list reproduced from a recorded program information storing part can be transmitted to the PC 63 through the digital interface 65.

Similarly, at the PC 63, a transmitted list can be changed freely corresponding to user's operation. When a list is updated at the PC 63, it is possible to further update a list in a recorded program information storing part of the DVD 64 corresponding to this new list.

With such configuration, for example, when AV equipment is made into a home network, a function will be provided so that a program information list on a recording medium of a recording equipment can be reloaded freely by other application equipment having a different user interface. In other words, it becomes possible for a plurality of users to reload the list respectively.

Although the description has been given on examples where mainly a digital VTR is used as a recording unit, other recording units are also applicable, and other storing media which are capable of instantaneous reading may be used instead of a cassette memory. For example, a DVD-RAM may be used as a recording unit. In this case, as stated above, it is sufficient if recording is designed to be carried out in a TOC area instead of a cassette memory.

In this embodiment, for a storing means where recorded program guide information or an API list of recorded program guide information is stored, when a digital VTR is used, the preferable is one which is capable of reading data instantaneously when reproduced, such as a memory mounted in a cassette (MIC: Memory In Cassette) or bar codes. When a DVD-RAM which is capable of recording is used, a TOC (Table of Contents) area is the best for writing. The present invention, of course, does not necessarily limit to any particular one.

At the time of actual mounting, it may be arranged so that, although writing is once done in MIC or TOC, until a power source of the DVTR or DVD-RAM is turned off, temporary writing is done in RAM (work area) of a micro or others and kept reloadable any time. Another possible method is that, during a period of time while a power source is turned on or when a key for turning it off is pressed, before the power source is actually turned off, all of recorded program guide information or an API list of recorded program guide information stored in said RAM is recorded again in MIC or TOC, then the power source is practically turned off.

Thus, this embodiment provides a method of giving a GUI display, at a television receiver, of a program list of programs recorded on a tape or a disk, a method of selecting a broadcasting station (music) and instructing reproduction, at a DVD or VTR, based on the GUI display shown by the television receiver, and an interfacing method (to deliver and receive data) which is common among a television receiver and equipment. With this feature, it is possible to provide an API which is able to cope with writing and changing from a plurality of equipment (a plurality of application).

AVAILABILITY IN INDUSTRY

As described above, an apparatus and method of displaying recorded contents according to the present invention is useful for an apparatus for displaying program guide information about recorded programs. For example, they are suitable for displaying program guide information when programs are recorded on a recording apparatus connected on a network which conforms to the IEEE 1394 standard.

What is claimed is:

1. An apparatus for displaying recorded contents, comprising:
    a plurality of devices connected on a network;
    a first recording device included in one of said plurality of devices, which records program data inputted in one of said plurality of devices;
    a second recording device included in one of said plurality of devices, in which program guide information that relates to said program data is inputted and which records or stores said program guide information on a predetermined recording medium on which said recording device records or in a storing medium which relates to said predetermined recording medium;
    a device using an application program interface which can be commonly owned by one or more devices in said network, said device being able to read and write list data prepared in correspondence with said application program interface based on said program guide information recorded on said recording medium or stored in said storing medium using said application program interface; and
    an updating device which updates said program guide information recorded on said recording medium or stored in said storing medium based on list data written by said application program interface.

2. An apparatus for displaying recorded contents according to claim 1, further comprising a display data generating device which generates display data to display a guide display about programs recorded on said predetermined recording medium based on said list data which is read using said application program interface.

3. An apparatus for displaying recorded contents according to claim 2, further comprising a display device which displays said guide display based on said display data.

4. An apparatus for displaying recorded contents according to claim 3, wherein said display device includes a device which uses said guide display as a graphical user interface and controls a selecting operation by a user and said first recording device.

5. An apparatus fir displaying recorded contents according to claim 2, wherein said display data generating device generates retrieving data for retrieving programs recorded on said predetermined recording medium based on information read by said second recording device from said predetermined recording medium or said storing medium.

6. An apparatus for displaying recorded contents according to claim 1, wherein said recording medium is a cassette tape, and a storing medium related to said recording medium is a cassette memory.

7. An apparatus for displaying recorded contents according to claim 1, wherein said recording medium is a DVD disk, and wherein said second recording is the one for recording information based on said program guide information in a TOC area of said DVD disk.

8. An apparatus for displaying recorded contents according to claim 1, further comprising a transmitting device which transmits changed list data to the device using said application program interface when written in the list data by said application program interface.

9. An apparatus for displaying recorded contents according to claim 1, further comprising an informing device which informs the device using said application program interface that said list data is changed when written in the list data by said application program interface.

10. An apparatus for displaying recorded contents, comprising:
    a device using an application program interface which can be commonly owned by one or more devices in a network on which a plurality of devices are connected, said device being able to read and write list data prepared in correspondence with said application program interface based on program guide information recorded in a predetermined recording medium by the devices in said network, from other devices using said application program interface; and
    an updating device which updates said program guide information stored in said predetermined recording medium based on the list data written by said application program interface.

* * * * *